US008717651B2

(12) United States Patent
Meloni et al.

(10) Patent No.: US 8,717,651 B2
(45) Date of Patent: May 6, 2014

(54) OPTICAL DEVICES AND METHOD OF COUNTING OPTICAL PULSES

(75) Inventors: Gianluca Meloni, Leghorn (IT); Antonella Bogoni, Mantova (IT); Antonio D'Errico, Calci (IT); Gianluca Berrettini, Pisa (IT); Luca Poti, Pisa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 60 days.

(21) Appl. No.: 13/496,190

(22) PCT Filed: Oct. 20, 2009

(86) PCT No.: PCT/EP2009/063721
§ 371 (c)(1),
(2), (4) Date: Jun. 1, 2012

(87) PCT Pub. No.: WO2011/032609
PCT Pub. Date: Mar. 24, 2011

(65) Prior Publication Data
US 2012/0229890 A1 Sep. 13, 2012

(30) Foreign Application Priority Data
Sep. 18, 2009 (EP) ..................................... 09170745

(51) Int. Cl.
*G02F 3/02* (2006.01)
*G06E 1/00* (2006.01)
(52) U.S. Cl.
CPC ... *G06E 1/00* (2013.01); *G02F 3/02* (2013.01)
USPC .......................................................... 359/107
(58) Field of Classification Search
USPC ................................................ 359/107, 108
See application file for complete search history.

(56) References Cited

U.S. PATENT DOCUMENTS

| 6,693,732 B2* | 2/2004 | Johnson et al. ............... 359/108 |
| 2007/0189705 A1* | 8/2007 | Covey ........................... 385/147 |
| 2011/0122470 A1* | 5/2011 | Berrettini et al. ............. 359/108 |

OTHER PUBLICATIONS

PCT International Search Report, dated Jun. 14, 2010, in connection with International Application No. PCT/EP2009/063721.
Zakynthinos, P. et al "Successful Interconnection of SOA-MZI Arrays and Flip-Flops to realize Intelligent, All-optical Routing" ECOC2008, ECOC, Brussels, Sep. 21-25, 2008, Belgium, XP001524919, ISBN: 978-1-4244-2228-9.

(Continued)

*Primary Examiner* — Mark Hellner
*Assistant Examiner* — Ari M Diacou
(74) *Attorney, Agent, or Firm* — Potomac Patent Group PLLC

(57) ABSTRACT

An optical device comprises an optical device stage, which comprises an optical input, an optical AND gate, an optical flip-flop and an optical output. The optical input is arranged to receive an optical input pulse at an input wavelength. The optical AND gate comprises a first input arranged to receive a part of said optical input pulse, a second input arranged to receive at least a part of a flip-flop optical output signal, and an output. The optical AND gate is arranged to generate an AND gate optical output pulse dependent on said flip-flop optical output signal. The optical flip-flop comprises a first input arranged to receive a further part of said optical input pulse, a second input arranged to receive a said AND gate optical output pulse, and an output. The optical flip-flop is arranged to generate said flip-flop output signal at a flip-flop output wavelength. At least a part of the flip-flop output signal is provided to said output.

17 Claims, 12 Drawing Sheets

(56) References Cited

OTHER PUBLICATIONS

Wang, J. et al. "All-optical binary counter based on semiconductor optical amplifiers" Optics Letters, OSA, Optical Society of America, Washington, DC, US LNKD-DOI:10.1364/OL.34.003517, vol. 34, No. 22, Nov. 15, 2009, pp. 3517-3519, XP001550127, ISSN: 0146-9592.

Jing Wang et al "All-Optical counter based on optical flip-flop and optical and gate" Optical Communication, 2009, ECOC '09, 35th European conference on, IEEE, Piscataway, NJ, USA, Sep. 20, 2009, pp. 1-2, XP031546660, ISBN: 978-1-4244-5096-1.

Herrera, J. et al. "160-GB/s All-Optical Packet Switching Over a 110-km Field Installed Optical Fiber Link" Journal of Lightwave Technology, IEEE Service Center, New York, NY, US, vol. 26, No. 1, Jan. 1, 2008, pp. 176-182, XP011204211, ISSN: 0733-8724.

Dorren, H.J.S. et al. "Optical packet switching and buffering by using all-optical signal processing methods", Journal of Lightwave Technology, vol. 21, No. 1, Jan. 2003.

\* cited by examiner

OPTICAL DEVICES AND METHOD OF COUNTING OPTICAL PULSES

CROSS-REFERENCE TO RELATED APPLICATIONS

This application claims priority under 35 U.S.C. §119 to European Patent Application No. 09170745.5, filed Sep. 18, 2009, which is hereby incorporated herein by reference in its entirety.

FIELD OF THE INVENTION

The invention relates to an optical device, an optical label recognizer and an optical packet switch. The invention further relates to a method of counting optical pulses.

BACKGROUND OF THE INVENTION

All-optical digital signal processing has attracted intensive research interest in recent years, particularly in relation to optical packet-switched communications networks. Various all-optical devices based on nonlinear optical effects, including cross-gain modulation, four-wave mixing and cross-phase modulation have been implemented. These include optical logic gates, optical shift registers, optical cross-connects and optical flip-flop memories, as reported by H. J. S Dorren et al, "Optical packet switching and buffering by using all-optical signal processing methods", Journal of Lightwave Technology, vol. 21, no. 1, January 2003.

SUMMARY OF THE INVENTION

It is an object to provide an improved optical device. It is a further object to provide an improved optical label recognizer. It is a further object to provide an improved optical packet switch. It is a further object to provide an improved method of counting optical pulses.

A first aspect of the invention provides an optical device comprising an optical device stage. Said optical device stage comprises an optical input, an optical output, an optical AND gate and an optical flip-flop. Said optical input is arranged to receive an optical input signal at an input wavelength. Said optical output is arranged to output an optical output signal. Said optical input signal comprises an optical input pulse. Said optical AND gate comprises a first input, a second input and an output. Said first input is arranged to receive a part of said optical input pulse. Said second input is arranged to receive at least a part of a flip-flop optical output signal. Said optical AND gate is arranged to generate an AND gate optical output pulse dependent on said flip-flop optical output signal. Said optical flip-flop comprises a first input, a second input and an output. Said first input is arranged to receive a further part of said optical input pulse. Said second input is arranged to receive a said AND gate optical output pulse. Said optical flip-flop is arranged to generate said flip-flop optical output signal at a flip-flop output wavelength. At least a part of said flip-flop optical output signal is provided to said optical output.

The invention thus provides an optical device able to perform 1 bit optical pulse counting, half optical frequency division and square wave form generation. The optical device is suitable for use in supporting all-optical data processing within optical packet switching operations in high capacity communication network nodes.

In an embodiment, said optical device comprises a said optical device stage and a final device stage. Said optical device stage further comprises a first optical splitter. Said optical splitter is arranged to split a said AND gate optical output pulse into a first part to be received by said optical flip-flop and a second part to form a carry signal optical pulse. Said final device stage comprises a further said optical device stage. Said optical input of said final device stage is arranged to receive a said carry signal optical pulse from said optical device stage. Said carry signal optical pulse forms said optical input pulse for said final device stage. At least a part of each said flip-flop optical output signals being provided to said respective optical outputs.

The optical device is able to perform 2 bit optical pulse counting, half and quarter optical frequency division, and square wave form generation at half repetition rate with respect to the input optical pulses.

In an embodiment, said optical device comprises a plurality of said optical device stages and said final device stage. Said optical input of a first said optical device stage is arranged to receive a said optical input pulse. Said optical input of each subsequent said optical device stage and of said final device stage are arranged to receive a respective said carry signal optical pulse from a respective preceding said optical device stage. Each said carry signal optical pulse forms a said optical input pulse for said respective device stage. At least a part of said flip-flop optical output signals of said optical device stages are provided to said respective optical output.

The optical device is able to perform multiple bit optical pulse counting. 3 and higher order bit counters can thus be provided by this serial configuration of optical device stages. The optical device is also able to preform optical frequency division at various factions of the input optical pulse frequency, the optical frequency being divided by half at each subsequent optical device stage and the final device stage, and square wave generation at various repetition rates with respect to input optical pulses, the square wave form repetition rate decreasing by half with each device stage.

In an embodiment, said final device stage further comprises a second optical splitter and a further optical output. Said second optical splitter is arranged to split a said AND gate optical output pulse into a first part to be received by said optical flip-flop and a second part to form a carry signal optical pulse of said final device stage. Said further optical output is arranged to output a further optical signal. Said carry signal optical pulse is provided to said further optical output.

The optical device is thus additionally able to output a square wave from the final device stage.

In an alternative embodiment, said optical device stage further comprises a first optical splitter and a further optical output. Said optical splitter is arranged to split a said AND gate optical output pulse into a first part to be received by said optical flip-flop and a second part to form a carry signal optical pulse. Said further optical output is arranged to output a further optical signal. At least a part of said carry signal optical pulse is provided to said further optical output.

Where the optical device comprises a single optical device stage, the optical device is able to perform 1 bit pulse counting, half optical frequency division, and square wave generation at half repetition rate with respect to the input optical pulses.

In an embodiment, the or each said optical flip-flop comprises a coupled pair of waveguide ring lasers. Each said waveguide ring laser comprises a non-linear optical gain element. Use of an optical flip-flop comprising coupled waveguide ring lasers enables high contrast ratios to be achieved between the flip-flop states. In addition, there is no difference in the optical mechanisms for switching between the flip-flop states, making symmetric set and re-set operations available. A wide range of wavelength may be used for input optical pulses to the optical flip-flop and a controllable switching threshold is achievable.

In an embodiment, said non-linear optical gain element comprises a semi-conductor optical amplifier. Use of a semi-conductor optical amplifier as the non-linear optical gain element of the waveguide ring lasers provides optical non-linearity and optical gain with high efficiency. In addition, the optical flip-flop can be provided as a photonic integrated device with a high level of integration due to the low power consumption and small footprint of the semi-conductor optical amplifier. In an embodiment, said non-linear gain element comprises a non-linear waveguide.

In an embodiment, the or each said optical flip-flop comprises a micro-resonator bistable element. Micro-resonator bistable elements enable the optical flip-flop to be compact with a low switching power.

In an embodiment, said optical flip-flops are synchronized to operate in unison.

In an embodiment, the or each said flip-flop optical output signal has an optical power below a threshold optical power, being a 0 state, or has an optical power above a threshold optical power, being a 1 state. The or each said optical AND gate comprises a non-linear optical element and an optical filter. Said non-linear optical element is arranged to receive a said part of a respective said optical input pulse. Said non-linear optical element is further arranged to receive a said at least part of a flip-flop optical output signal from a respective said flip-flop. When said flip-flop optical output signal has a 1 state, said optical input pulse and said at least part of a flip-flop optical output signal experience a non-linear optical effect on propagation through said non-linear optical element. A said AND gate optical output pulse is thereby generated at a further wavelength. Said optical filter is arranged to transmit at said respective further wavelength.

The optical flip-flop therefore always outputs a flip-flop optical output signal, however the AND gate only generates an AND gate optical output pulse when the flip-flop output signal is in the 1 state.

In an embodiment, said first optical flip-flop input comprises a Set input and said second optical flip-flop input comprises a Reset input.

In an embodiment, said non-linear optical element of said optical AND gate comprises a semiconductor optical amplifier. Use of a semi-conductor optical amplifier as the non-linear optical element of the optical AND gate provides an efficient optical AND gate, due to the strong and fast change of the refractive index exhibited by the semi-conductor optical amplifier, together with the high gain achievable within a semi-conductor optical amplifier. In addition, use of a semi-conductor optical amplifier enables the optical AND gate to be provided as a photonic integrated device.

In an embodiment, said non-linear optical effect comprises one of four-wave-mixing and cross-gain-modulation.

In an embodiment, the or each said optical device stage further comprises a first optical delay line provided between said flip-flop output and said second input of said optical AND gate. In an embodiment, the or each said optical device stage further comprises a second optical delay line provided between said output of said optical AND gate and said second input of said optical flip-flop. The provision of the optical delay lines ensures the correct timing of the arrival of an AND gate optical output pulse at the optical flip-flop and the arrival of the at least part of the flip-flop optical output signal at the optical AND gate.

In an embodiment, said optical device comprises an optical counter and the or each said optical output comprises a respective output of said optical counter. The invention thus provides an all optical pulse counter. The optical pulse counter is able to perform 1 bit, 2 bit and 3 or higher order bit counting of input optical pulses.

In an embodiment, said optical device comprises an optical frequency divider. The or each optical device stage further comprises a first optical splitter and a further optical output. Said first optical splitter is arranged to receive a said AND gate output pulse and to split off a part of said output pulse to form a frequency divided optical output pulse. Said further optical output pulse is arranged to output a further optical signal. Said frequency divided optical output pulse is provided to said further optical output. The invention thus provides an optical frequency divider. The optical frequency divider is able to perform half, quarter and higher order optical frequency division of the input optical pulses.

In an embodiment, the or each optical device stage is arranged to divide a frequency of an optical signal received at a respective said input by two. A two stage frequency divider is thus provided which is able to generate frequency divided optical output pulses at one-half and one-quarter of the frequency of optical input pulses.

In an embodiment, said optical device comprises a square-wave generator. The or each said optical output comprises a respective output of said square-wave generator. In a square-wave generator comprising two or more device stages, each square-wave output has a different period, the square-wave period increasing with each device stage.

A second aspect of the invention provides an optical label recognizer comprising an optical label extractor, and optical counter as described above, and a label processor. Said optical label extractor is arranged to extract an optical label from an optical data packet. Said label processor is arranged to recognize an extracted optical label and to generate a label signal indicative of said extracted optical label.

The invention thus provides an all optical label recognizer.

A third aspect of the invention provides an optical packet switch comprising an optical label recognizer as described above, an optical switch fabric and a controller. Said controller is arranged to receive said label signal from said optical label recognizer. Said controller is further arranged to generate a switch control signal. Said switch control signal is arranged to control switching of said optical switch fabric in accordance with said label signal.

The invention thus provides an all optical packet switch in which label recognition and packet routing is carried out in the optical domain.

A fourth aspect of the invention provides a method of counting optical pulses. Said method comprises receiving an optical input pulse to be counted. Said optical input pulse comprises a first wavelength. Said method further comprises receiving a first part of said optical input pulse at a first input of an optical AND gate. An AND gate optical output pulse is generated dependent on at least part of a flip-flop optical output signal received at a second input of said optical AND gate. Said method further comprises receiving a second part of said optical input pulse at a first input of an optical flip-flop. Said flip-flop optical output signal is generated having an optical power dependent upon whether a said AND gate output optical pulse has been received at a second input of said optical flip-flop. At least part of said flip-flop optical output signal is provided as a counter output signal.

The invention provides a method of all-optical counting of optical pulses. The method is suitable for use in all-optical packet switching operations to support all-optical data processing in high capacity optical communication network nodes. The method enables 1 bit and higher bit all-optical counting of all optical pulses to be carried out.

In an embodiment, said method further comprises splitting a said AND gate optical output pulse into first and second parts. Said first part is received at said first input of said optical flip-flop. Said second part forms a carry signal optical pulse. Said method further comprises directing said carry signal optical pulse to a further optical AND gate and a further optical flip-flop for counting.

In an embodiment, said method comprises receiving said first part of said optical pulse at said first input of said optical AND gate and receiving said at least part of said flip-flop optical output signal at said second input of said optical AND gate. Said first part of said optical pulse is caused to experience a non-linear effect when said optical power of said at least part of said flip-flop optical output signal is above a threshold optical power. A said AND gate optical output pulse comprising a further wavelength is thereby generated.

In an embodiment, said non-linear optical effect comprises one of four-wave-mixing and cross-gain-modulation.

DESCRIPTION OF EMBODIMENTS OF THE INVENTION

Figure 1:
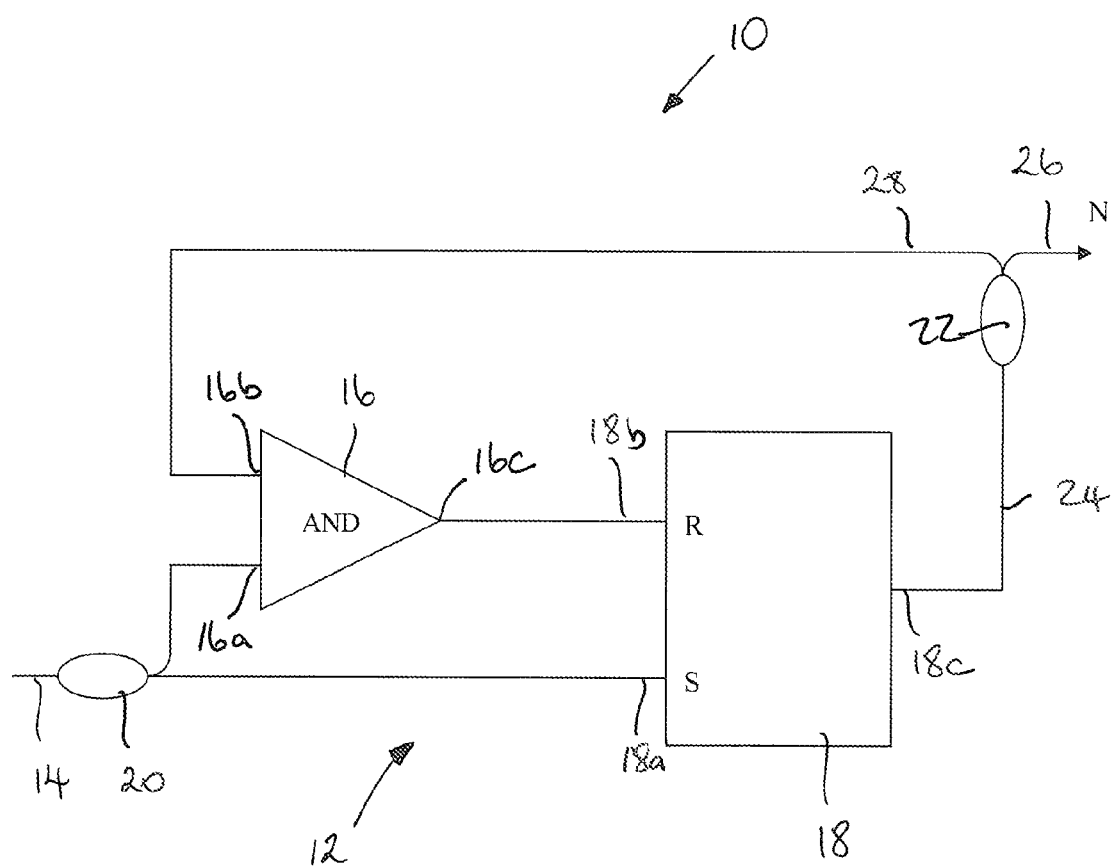
FIG. 1 is a schematic representation of an optical device according to a first embodiment of the invention.

Referring to FIG. 1, a first embodiment of the invention provides an optical device 10 comprising an optical device stage 12. The optical device stage 12 comprises an optical input 14, an optical AND gate 16, an optical flip-flop 18, and an optical output 26.

The optical input 14 is arranged to receive an input optical pulse at an input wavelength. The optical output 26 is arranged to output an optical output signal.

The optical AND gate 16 comprises a first input 16a, a second input 16b and an output 16c. The optical device stage 12 further comprises a first optical splitter 20 arranged to split an optical input pulse into first and second parts. The first input 16a of the optical AND gate is arranged to receive a first part of the optical input pulse. The second input 16b of the optical AND gate 16 is arranged to receive part of a flip-flop optical output signal 24. The optical AND gate 16 is arranged to generate an AND gate optical output pulse at the AND gate output 16c dependant on the flip-flop optical output signal 24.

The optical flip-flop 18 comprises a first input 18a, a second input 18b and an output 18c. The first input 18a is arranged to receive the second part of the optical input pulse from the first optical splitter 20. The second input 18b is arranged to receive an AND gate optical output pulse from the optical AND gate 16. The optical flip-flop 18 is arranged to generate a flip-flop optical output signal 24 at a flip-flop output wavelength. A second optical splitter 22 is coupled to the output 18c of the optical flip-flop 18. The second optical splitter 22 splits a flip-flop optical output signal 24 into a first part 28 which is routed to the second input 16b of the optical AND gate 16 and a second part which is provided to the optical output 26.

The optical components of the optical device stage 12, namely the optical input 14, optical output 26, optical AND gate 16, optical flip-flop 18 and optical splitters 20 are optically coupled to one another by means of optical waveguides, which can take the form of optical fibres or plainer optical waveguides.

Figure 2:
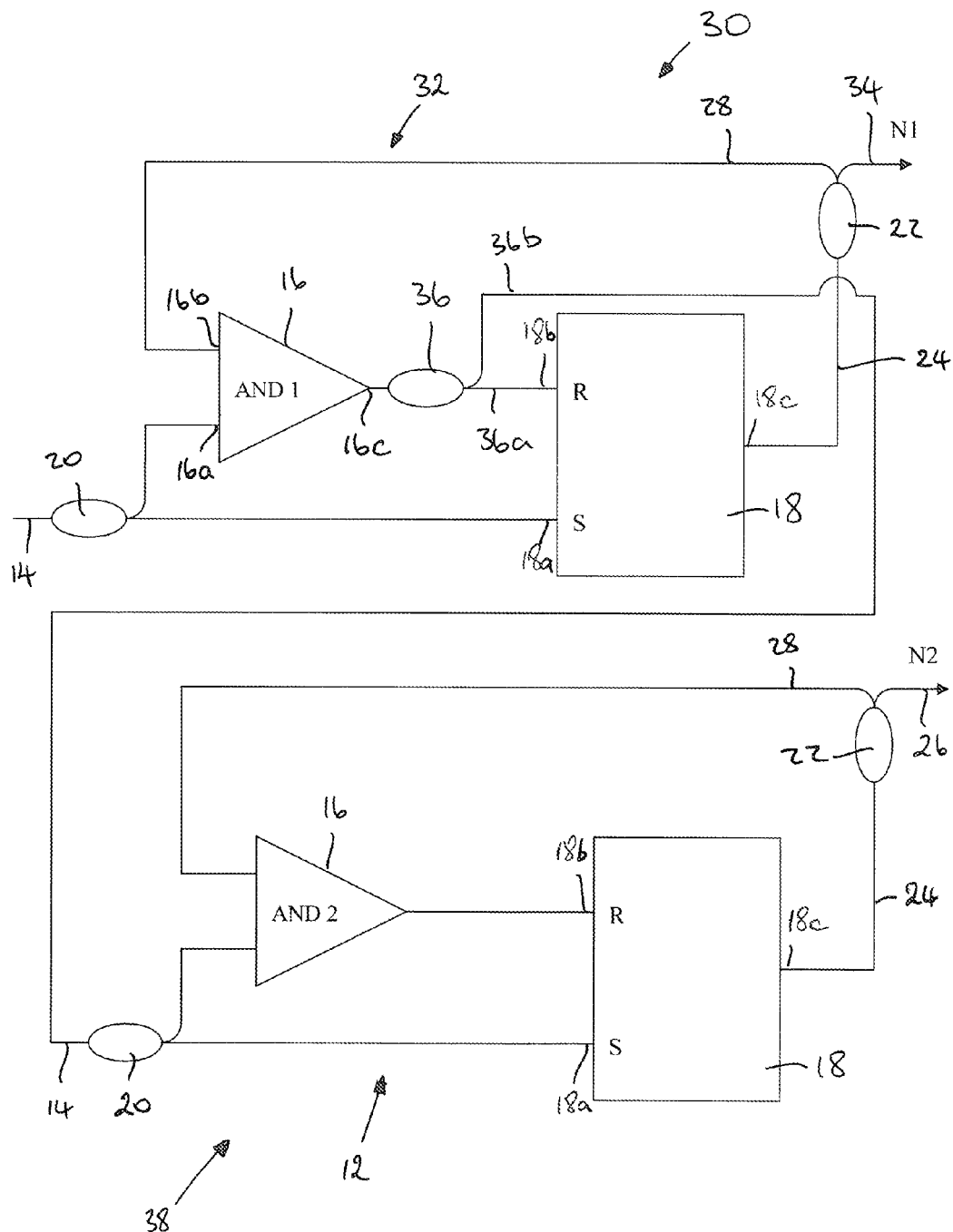
FIG. 2 is a schematic representation of an optical device according to a second embodiment of the invention.

Referring to FIG. 2, a second embodiment of the invention provides an optical device 30 comprising a first optical device stage 32 and a final optical device stage 38.

The first optical device stage 32 is substantially the same as the optical device stage 12 of FIG. 1, with the following modifications. The same reference numbers are retained for corresponding features.

The first optical device stage 32 further comprises an optical splitter 36 coupled to the output 16c of the optical AND gate 16. The optical splitter 36 is arranged to receive an AND gate optical output pulse and to split the AND gate output pulse into first and second parts 36a, 36b. The first part 36a is coupled from the splitter 36 to the second input 18b of the optical flip-flop 18. The second part 36b forms a carry signal optical pulse of the first optical device stage 32.

The flip-flop optical output signal 24 of the first device stage 32 is split into a first part 28, which is directed to the second input 16b of the optical AND gate 16 (AND 1), and a second part 34 which is provided to a first optical output (N1) 34.

The final device stage 38 comprises an optical device stage 12 as shown in FIG. 1. The carry signal optical pulse 36b of the first optical device stage 32 is coupled to the input 14 of the final device stage 38 and forms the input optical pulse of the final device stage. The flip-flop output signal 24 of the final device stage 38 is split into a first part 28 which is coupled to the second input 16b of the optical AND gate 16 (AND 2) and a second part which is provided to a second optical output (N2) 26.

Figure 3:
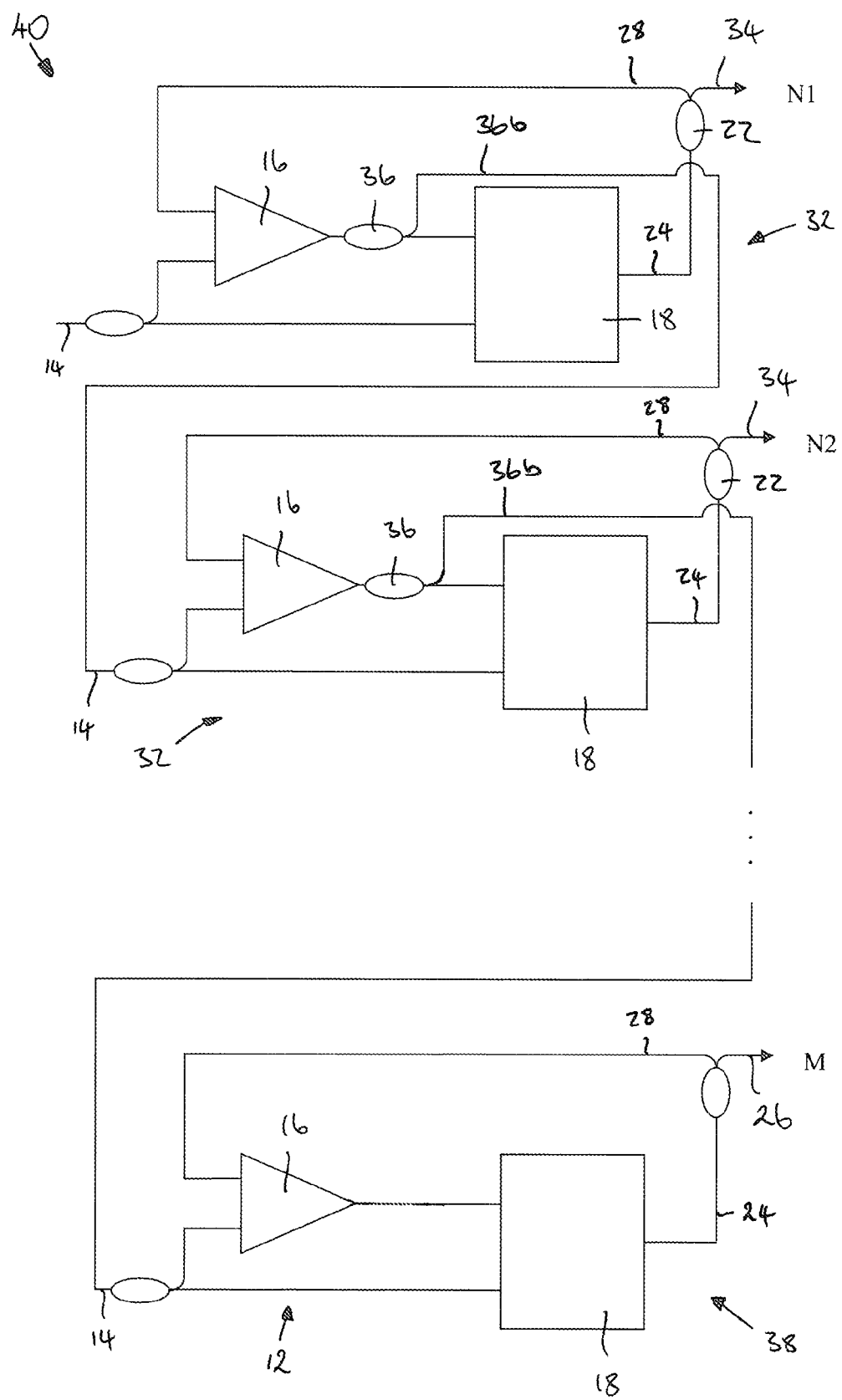
FIG. 3 is a schematic representation of an optical device according to a third embodiment of the invention.

A third embodiment of the invention provides an optical device 40, as shown in FIG. 3. The optical device 40 comprises a plurality of optical device stages 32 and a final device stage 12. The carry signal optical pulse 36b of a first optical device stage 32 is coupled to the input 14 of a subsequent optical device stage 32 and forms its input optical pulse. The carry signal optical pulse 36b of the penultimate optical device stage 32 is coupled to the input 14 of the final device stage 12 and forms the input optical pulse to the final device stage.

A first part of the flip-flop output signal 24 of each optical device stage 32 is provided to a respective optical output (N1, N2 etc) 34. A first part of the flip-flop output signal 24 of the final device stage 12 is provided to the optical output (M) 26 of the final device stage 38.

Figure 4:
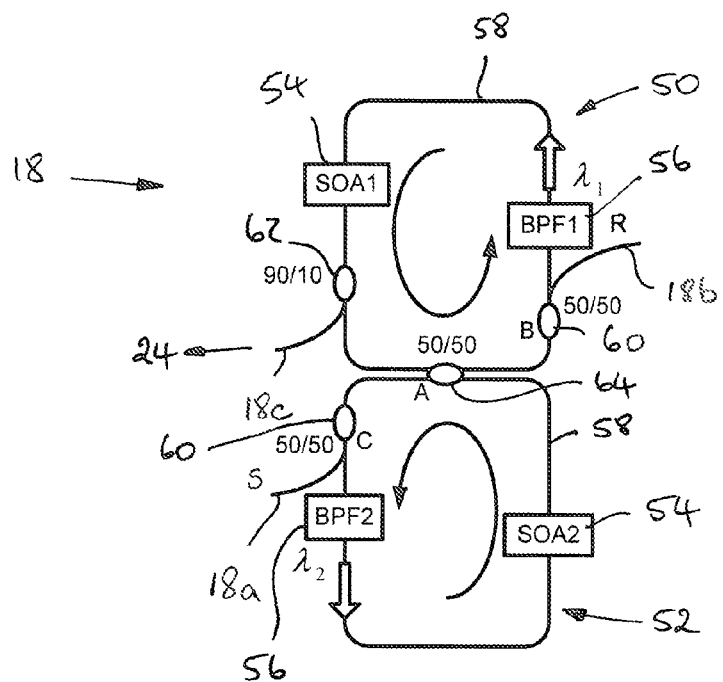
FIG. 4 is a schematic representation of an optical flip-flop which may be used in the optical devices of FIGS. 1 to 3.

FIG. 4 shows an optical flip-flop 18 which may be used with any of the optical devices 10, 30, 40 of FIGS. 1 to 3. The same reference numbers are retained for corresponding features.

The optical flip-flop 18 comprises a coupled pair of waveguide ring lasers 50, 52. Each waveguide ring laser 50, 52 comprises a non-linear optical gain element, in the form of a semi-conductor optical amplifier (SOA1, SOA2) 54, a band pass filter (BPF1, BPF2) 56 and an optical waveguide 58. The flip-flop inputs 18a, 18b are coupled into the respective ring waveguides 58 via 50/50 optical couplers 60. The flip-flop output 18c is provided within the first optical waveguide ring laser 50 and is coupled to the waveguide ring 58 by a 90/10 optical coupler 62. The optical waveguides 58 of the two optical waveguide ring lasers 50, 52 are coupled by means of a further 50/50 optical coupler 64.

The optical waveguide ring lasers 50, 52 operate at wavelengths X1 and X2 respectively.

The optical flip-flop 18 has two output states: "1" and "0". In state "1" the first optical waveguide ring laser 50 is lasing and light at X1 is coupled into the second optical waveguide ring laser 52, by means of the 50/50 coupler 64. The light coupled from the first waveguide ring laser 50 into the second waveguide ring laser 52 depletes the carriers of the SOA 54 (SOA2) of the second waveguide ring laser 52, so lasing is suppressed within the second waveguide ring laser 52. The resulting flip-flop optical output signal 24 therefore outputs a state "1" optical signal, having an optical power above a threshold optical power. In state "0", the second optical waveguide ring laser 52 lases and part of the laser signal generated within the second optical waveguide ring laser 52 is coupled, via the 50/50 optical coupler 64, into the first optical waveguide ring laser 50. This causes the carriers in the SOA 54 (SOA1) of the first optical waveguide ring laser 50 to be depleted and lasing is suppressed within the first optical waveguide ring laser 50. The resulting flip-flop optical output signal 24 therefore has a "0" state, having an optical power below a threshold optical power.

The state of the optical flip-flop 18 is changed as a result of optical pulses being received at the first 18a and second 18b inputs. In this example, the first input 18a comprises a "Set" input to the flip-flop 18 and the second input 18b comprises a "Re-set" input to the flip-flop 18. An optical pulse received at the set input 18a will cause the SOA 54 (50A2) within the second waveguide ring laser 52 to be saturated and will thus suppress lasing within the second waveguide ring laser 52. This will set the optical flip-flop 18 to stage "1". An optical pulse input to the re-set input 18b will similarly cause the SOA 54 (SOA1) of the first optical waveguide ring laser 50 to be saturated, suppressing lasing within the first optical waveguide ring laser 50 and setting the flip-flop 18 to state "0".

Figure 5:
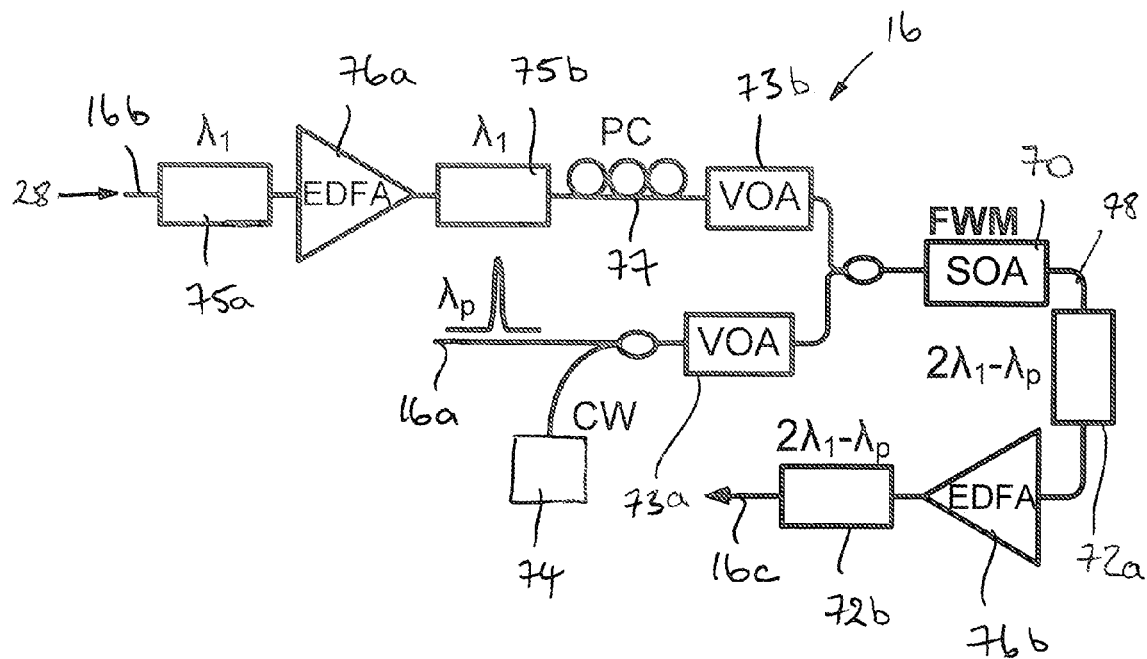
FIG. 5 is a schematic representation of an optical AND gate which may be used in the optical devices of FIGS. 1 to 3.

FIG. 5 shows an optical AND gate 16 which may be used with any of the optical devices 10, 30, 40 of FIGS. 1 to 3. The same reference numbers are retained for corresponding features.

The optical AND gate 16 comprises a non-linear optical element in the form of an SOA 70 and first and second optical filters 72a, 72b.

The first input 16a of the AND gate 16 is coupled to the SOA 70 via a first variable optical attenuator (VOA) 73a, arranged to adjust the optical power of the optical input pulses delivered to the SOA 70. The optical AND gate 16 additionally comprises a continuous wave (CW) optical source 74 the output of which is coupled to the SOA 70 via the VOA 73a. The CW optical signal acts to saturate the SOA 70, to thereby remove any CW pedestal within the SOA output optical signal due to amplified spontaneous emission noise from the SOA 70.

The second input 16b of the AND gate 16 is coupled to the SOA 70 via first and second optical filters 75a, 75b arranged to transmit at X1 (the output wavelength of the optical flip-flop 18) to remove any noise from the received part of the flip-flop optical output signal 28. A first erbium doped fibre amplifier (EDFA) 76a is provided to amplify the received part of the flip-flop output signal 28. A polarization controller (PC) 77 is provided to control the polarization of the received part of the flip-flop output signal 28 and a second VOA 73b is provided to adjust the input power of the received part of the flip-flop output signal 28 delivered to the SOA 70.

When the flip-flop optical output signal 24 is in state "1", the received part of the flip-flop optical output signal has an optical power above a threshold optical power, the received part of the flip-flop output signal 28 and the input pulse (λp) undergo four-wave mixing (FWM) on transmission through the SOA 70. An AND gate optical output pulse 78 is thereby generated at a further wavelength. In the case of four-wave mixing, the further wavelength is the four-wave mixing conjugate wave signal at a wavelength of 2λ1-λp. The optical filters 72 are arranged to transmit at 2λ1-λp, to filter out any ASE noise from the SOA 70. A further EDFA 76b is provided between the optical filters 72a, 72b to amplify the AND gate output pulse 78.

Figure 6:
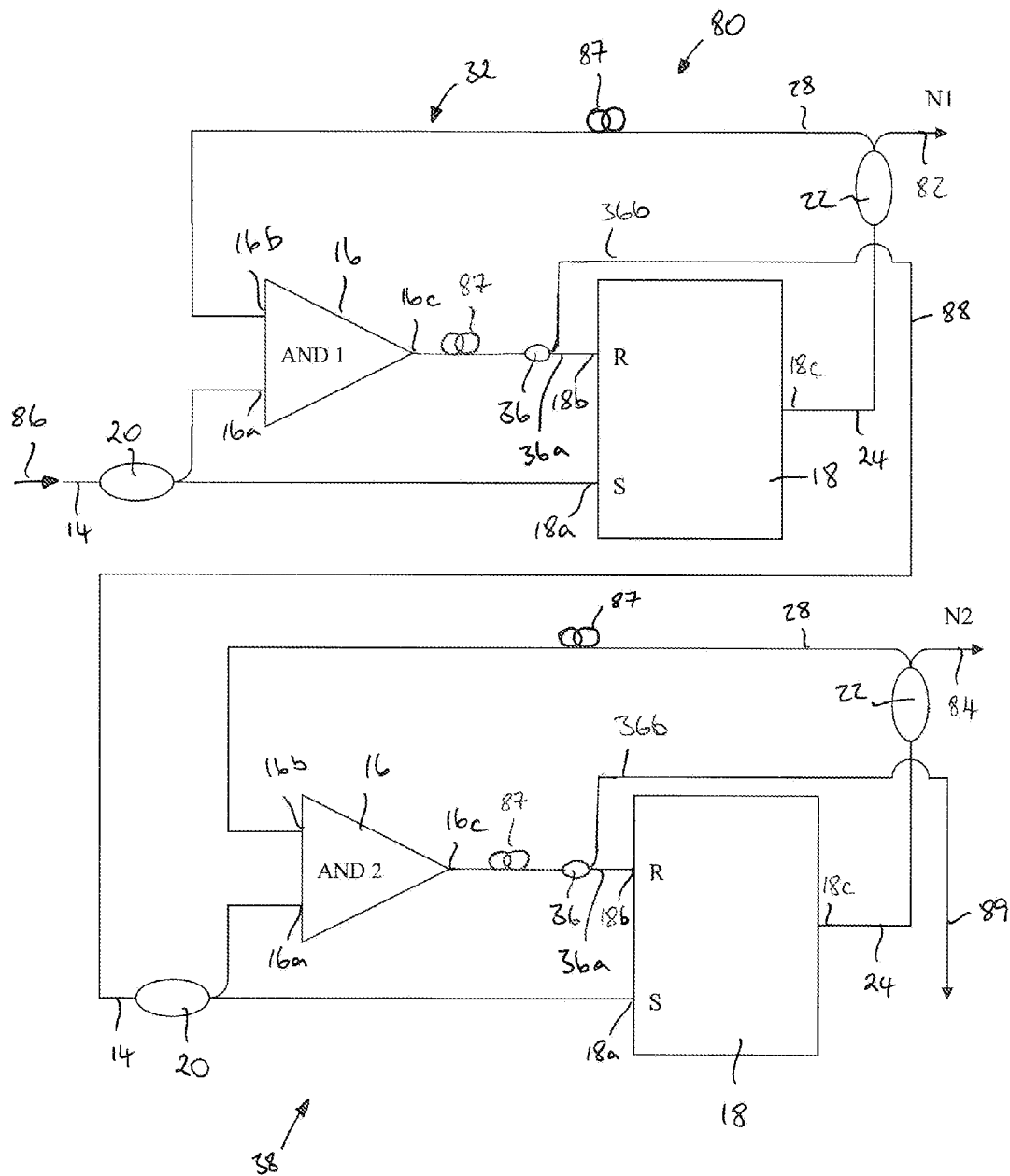
FIG. 6 is a schematic representation of an optical counter according to a fourth embodiment of the invention.

Referring to FIG. 6, a fourth embodiment of the invention provides an optical counter 80. The optical counter 80 is substantially the same as the optical device 30 of FIG. 2, with the following modifications. The same reference numbers are retained for corresponding features.

In the optical counter 80, the final device stage 38 further comprises an optical splitter 36 arranged to split an AND gate output optical pulse into a first part 36a to be received by the optical flip-flop 18 and a second part 36b which forms a further carry signal optical pulse.

The flip-flop output signal 24 of each optical device stage 32, 38 is split by an optical splitter 22 into a first part 28 which is routed to the second input 16b of the respective optical AND gate 16 and a second part which is provided to the respective optical outputs (N1, N2) 82, 84.

The optical counter 80 further comprises an optical delay line 87 between each AND gate 16 and the respective Re-set input 18b and a further optical delay line 87 between the respective splitter 22 and the second input 16b to the respective AND gate 16.

Figure 7:
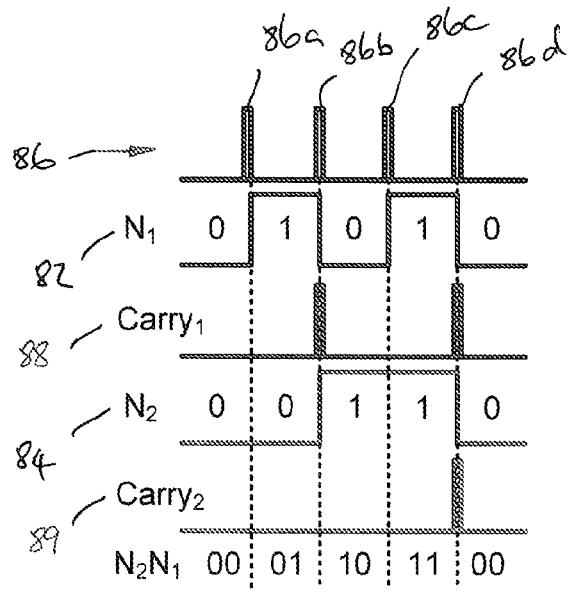
FIG. 7 shows the outputs of the optical counter of FIG. 6.

The optical counter 80 is a 2-bit optical counter, which operates as follows, with reference to FIG. 7. Initially, both flip-flops 18 are in state "0", generating "0" output signals of low optical power (being an optical power below a threshold optical power). The two optical outputs 82, 84 (N1, N2) therefore both output "0" output signals (N2N1=00). On receipt of a first optical input pulse 86a at the input 14 of the first optical device stage 32, the first optical input pulse 86a is split into two parts. The first part is directed to the first (Set) input 18a of the flip-flop 18 and the second part is directed to the first input 16a of the AND gate (AND1) 16. Since the flip-flop optical output signals 24 are "0", the part of the flip-flop optical output signal 28 received at the second input 16b of the AND gate 16 (AND1) is "0", and therefore the first optical input pulse 86a cannot pass the AND gate 16 (AND1). Therefore only the Set input 18a of the optical flip-flop 18 receives a pulse, and the flip-flop 18 of the first device stage 32 is set to state "1". The flip-flop optical output signal 24 from the first device stage 32 is therefore a "1" and optical output signal from the optical output 82 (N1) of the first device stage 32 is "1". The output of the optical counter 80 following receipt of the first optical input pulse 86a is therefore N2N1=01.

When a second optical input pulse 86b is input to the first optical device stage 32, a first part is received at the Set input 18a of its flip-flop 18, resulting in the flip-flop 18 remaining at state "1". Since the flip-flop output signal 24 is "1", the part of the flip-flop optical output signal 28 received at the second input 16b of the optical AND gate 16 (AND1) is in state "1". The second optical input pulse 86b can therefore pass the AND gate (AND1) 16 of the first device stage 32.

Due to the optical fibre delay line 87 between the optical AND gate output 16c and the re-set input 18b of the first optical device stage 32, the AND gate optical output pulse is received at the Re-set input 18b later than the second input pulse 86b is received at the Set input 18a, causing the optical flip-flop 18 of the first device stage 32 to be set back to state "0".

As described above, the AND gate output pulse is split into first and second parts 36a, 36b by an optical splitter 36, and one part 36b of the AND gate output pulse forms a first carry signal 88 optical pulse of the first optical device stage 32. The carry signal optical pulse 88 forms the optical input pulse to the final optical device stage 38. The carry signal optical pulse 88 is split by the optical splitter 20 of the final device stage 38 into a first part which is directed to the Set input 18a of the optical flip-flop 18 of the final device stage 38 and a second part which is directed to the first input 16a of the AND gate (AND2) 16. Receipt of the carry signal optical pulse 88 at the Set input 18a causes the optical flip-flop 18 of the final device stage 38 to be set to state "1". The outputs of the optical counter 80 are therefore N2N1=10.

When a third optical input pulse 86c is received at the first optical device stage 32, it sets the optical flip-flop 18 of the first device stage 32 to state "1" but because the flip-flop output signal 24 of the first optical device stage 32 is currently in state "0", the third optical input pulse 86c cannot pass the AND gate (AND1) 16 of the first optical device stage. Therefore the outputs of the optical counter 80 are N2N1=11.

When a fourth optical input pulse 86d is received at the first optical device stage 32, it is able to pass the AND gate (AND1) 16 of the first optical device stage 32, since the flip-flop optical output pulse is currently in state "1". Due to the presence of the optical delay line 87 between the AND gate output 16 and the Re-set input 18b, the Re-set input 18b receives the resulting AND gate optical output pulse later than the Set input 18a receives the fourth optical input pulse 86d. The flip-flop 18 of the first device stage is therefore set to state "0". The AND gate output pulse is again split by the optical splitter 36 into first and second parts 36a, 36b to form a further carry signal optical pulse 88, which forms a further input optical pulse to the final device stage 38. As the flip-flop output signal 24 of the flip-flop 18 of the final device stage 38 is in state "1", the part of the flip-flop optical output signal 28 received at the second input 16b of the AND gate (AND2) 16 is in state "1" and the carry signal optical pulse is therefore passed by the AND gate 16 and an AND gate output pulse is generated. The AND gate optical output pulse is directed to the Re-set input 18b via the optical delay line 87, resulting in the AND gate output pulse being received at the Re-set input 18b later than the carry signal 88 is received at the Set input 18a. The flip-flop 18 of the final device stage is therefore re-set to state "0". The output of the optical counter 80 is therefore returned to N2N1=00.

Figure 8:
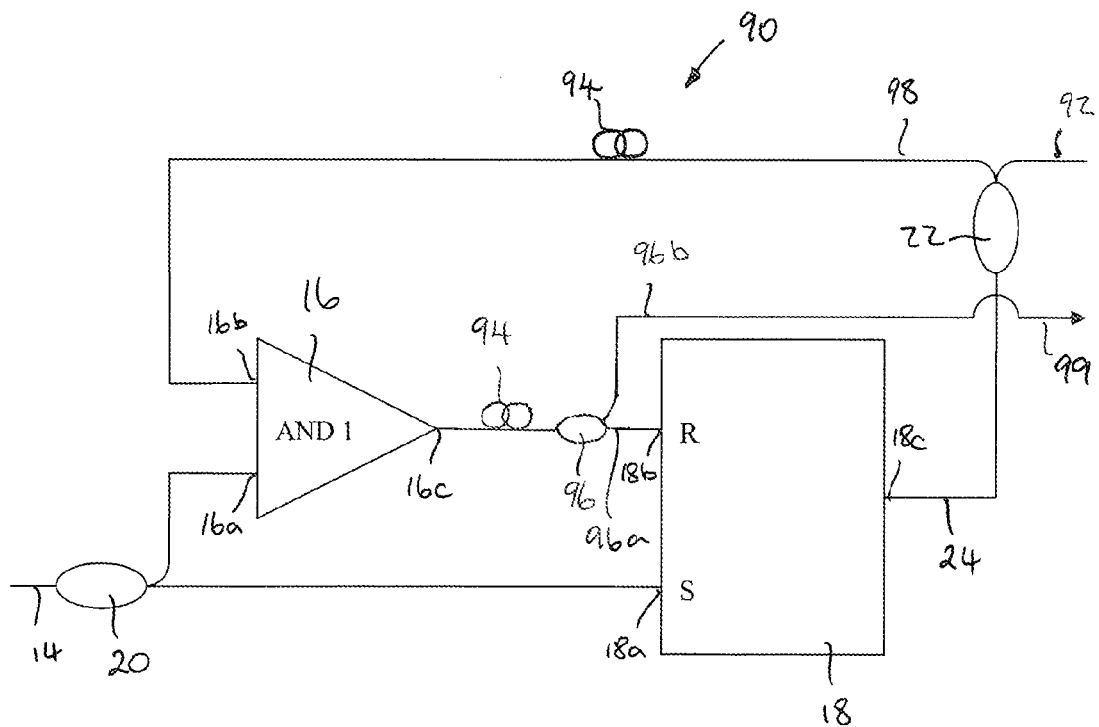
FIG. 8 is a schematic representation of an optical frequency divider according to a fifth embodiment of the invention.

Referring to FIG. 8, a fifth embodiment of the invention provides an optical frequency divider 90. The optical frequency divider 90 is substantially the same as the optical device 10 as shown in FIG. 1, with the following modifications.

The flip-flop optical output signal 24 is split by optical splitter 22 into a first part, which is provided to an optical output 92, and a second part 98 which forms the input to the second input 16b of the optical AND gate 16. The optical counter 90 further comprises an optical delay line 94 between the optical splitter 22 and the second input 16b of the AND gate 16. The optical frequency divider 90 further comprises a second delay line 94 provided between the output 16c of the optical AND gate 16 and, the Re-set input 18b of the optical flip-flop 18. The optical frequency divider 90 further comprises an optical splitter 96 provided between the delay line 94 and the Re-set input 18b. The optical frequency divider 90 further comprises a further optical output 99 which is arranged to output an optical output of the optical frequency divider.

The optical splitter 96 splits an AND gate output optical pulse into a first part 96a and a second part 96b. The first part 96a is directed to the Re-set input 18b and the second part 96b is provided to the further optical output 99.

The optical frequency divider 90 acts to divide the optical frequency of optical input pulses received at the optical input 14 by two, so that the output 96b of the optical frequency divider comprises optical pulses of half the frequency of the optical input pulses.

Figure 9:
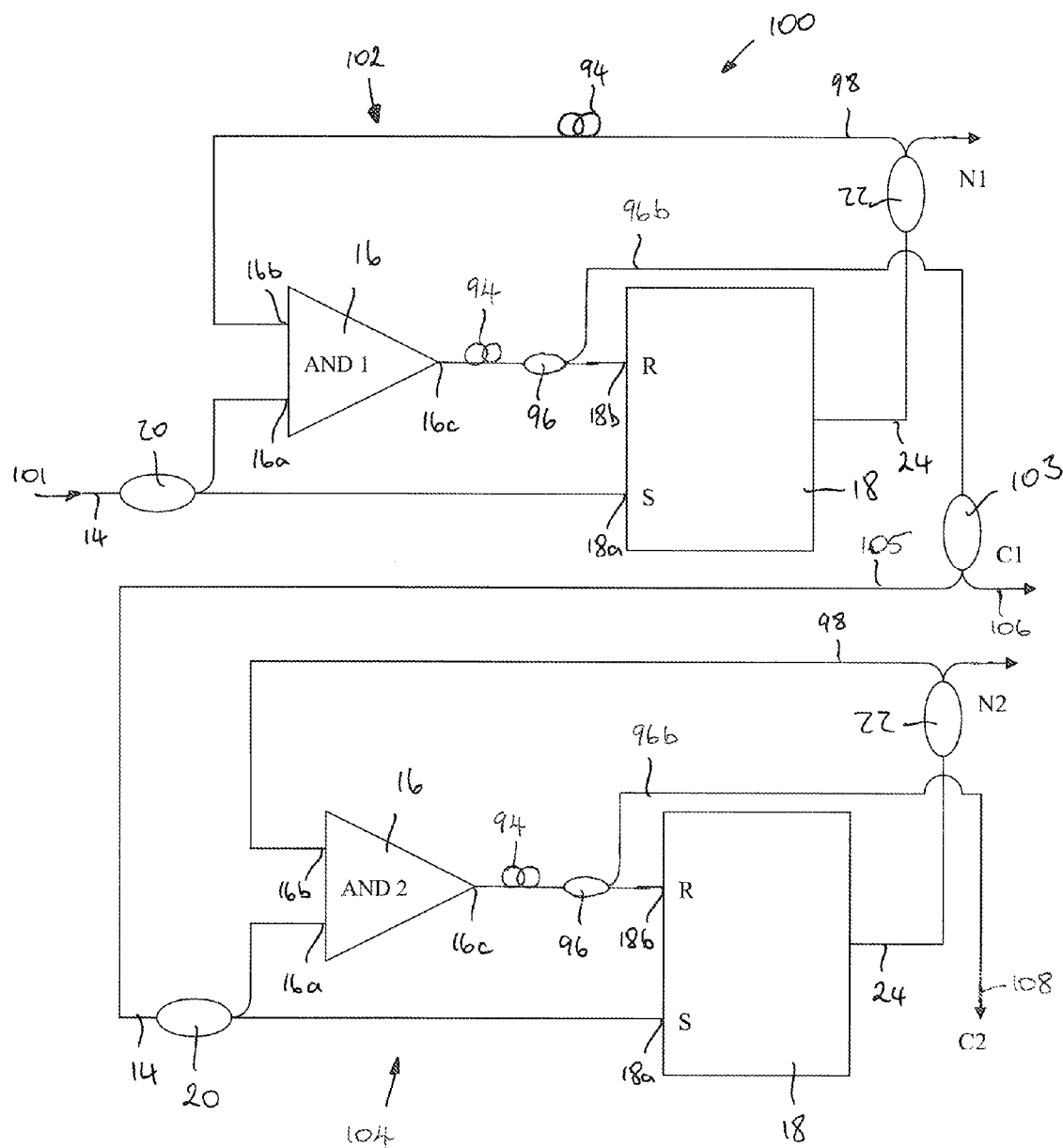
FIG. 9 is a schematic representation of an optical frequency divider according to a sixth embodiment of the invention.

A sixth embodiment of the invention provides an optical frequency divider 100 as shown in FIG. 9. The optical frequency divider 100 is substantially the same as the optical frequency divider 90 of the previous embodiment, with the following modifications. The same reference numbers are retained for corresponding features.

The optical frequency divider 100 comprises a first optical device stage 102 and a final optical device stage 104. The optical device stages 102, 104 are substantially the same as the optical device stage of the optical counter 90 of FIG. 8, with the following modifications.

The first optical device stage 102 further comprises a further optical splitter 103 and a first optical output (C1) 106. The further optical splitter 103 is arranged to receive the carry signal 96b of the first optical device stage 102 and to split the carry signal 96b into a first part 106 and a second part 105. The first part is provided to the first output (C1) 106. The second part 105 forms the input optical pulse for the second optical device stage 104.

The optical signal output at the first output 106 has a frequency of one half of the frequency of the optical input pulses received at the input 14 of the first optical device stage 102.

The second optical device stage 104 further comprises a second optical output (C2) 108. The carry signal 96b of the second optical device stage 104 is provided to the second output (C2) 108.

The optical frequency divider 100 is thus arranged to generate output optical signals at one half (C1) of the frequency of optical input pulses and one quarter (C2) of the frequency of optical input pulses.

Figure 10:
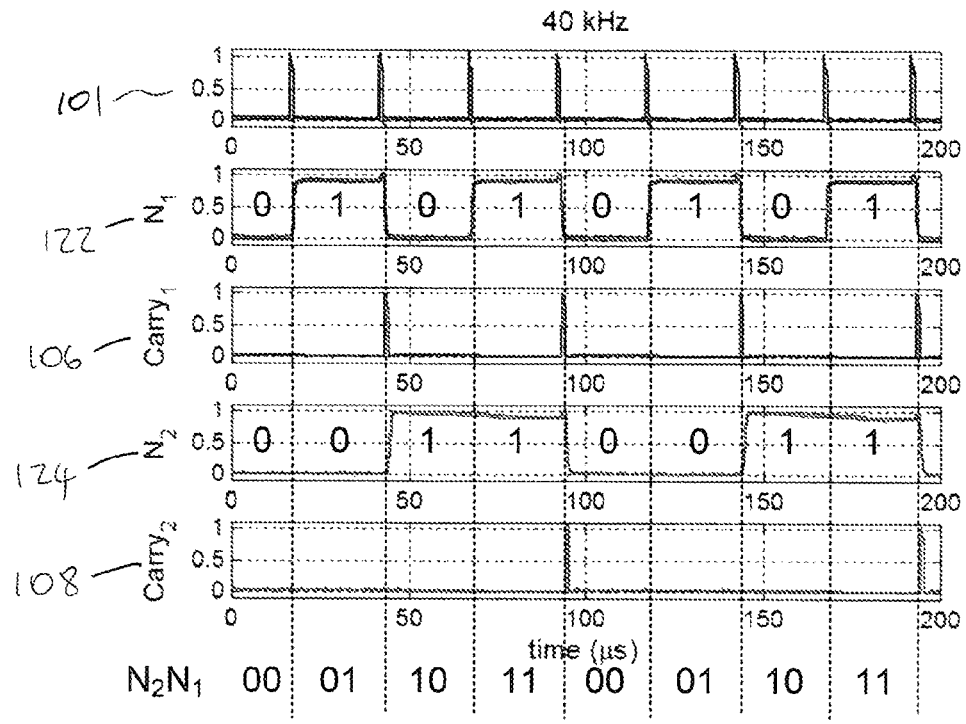
FIG. 10 shows the input and outputs of the optical frequency divider of FIG. 9 and the square-wave generator of FIG. 12.

FIG. 10 shows a series of optical input pulses 101 received at the input 14 of the optical frequency divider 100, and the output signals (C1) 106, (C2) 108 of the optical frequency divider at one half and one quarter of the frequency of optical input pulses respectively.

In this example, the optical input pulses 101 have a wavelength ($\lambda$p) of 1554.1 nm and the flip-flop output signal 24 of the first optical device stage 102 has a wavelength ($\lambda$1) of 1552.5 nm. The AND gate optical output pulse of the first device stage 102 has a FWM wavelength of $\lambda c1=2\lambda 1-\lambda p$=1550.9 nm. The flip-flop output signal 24 of the flip-flop 18 in the final optical device stage 104 has a wavelength ($\lambda$2) of 1549.3 nm. The AND gate optical output pulse of the final optical device stage 104 has a FWM wavelength of $\lambda c2=2\lambda c1$. The optical input pulses have a repetition rate of 40 kHz with a 1 µs pulse width.

The optical output signal output from the optical outputs (C1, C2) 106, 108 of the optical frequency divider 100 have repetition rates of 20 µs and 10 µs respectively.

The Q-factor of the input pulses 101 is 32.5. The Q-factors of N1 and N2 are 6.1 and 9.9 respectively. Due to the low repetition rate and the gain-tilt mechanism of the EDFAs 76 of the optical AND gates 16 C1 has a Q-factor of 7.0. The provision of the CW light to saturate the SOA 70 results in C2 having a Q-factor of 15.0. The Q-factor of C2 is only slightly lower than that of C1, confirming the cascadability of the optical counter 100.

Figure 11:
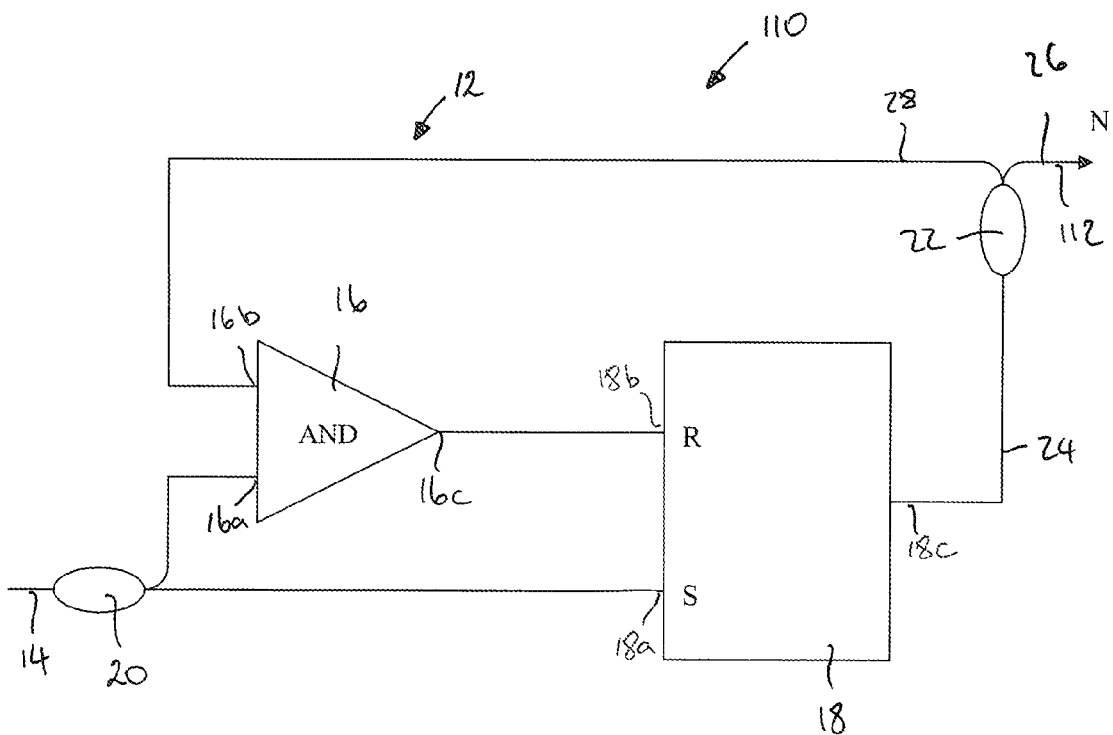
FIG. 11 is a schematic representation of an optical square-wave generator according to a seventh embodiment of the invention.

FIG. 11 shows an optical square wave generator 110 according to a seventh embodiment of the invention. The optical square wave generator 110 is substantially the same as the optical device 10 of FIG. 1, with the following modifications. The same reference numbers are retained for corresponding features.

The flip-flop output signal 24 is divided by the optical splitter 22 into a first part 28 and a second part 112. The first part 28 is directed to the second input 16b of the optical AND gate 16. The a second part 112 is provided the output (N) 26.

Figure 12:
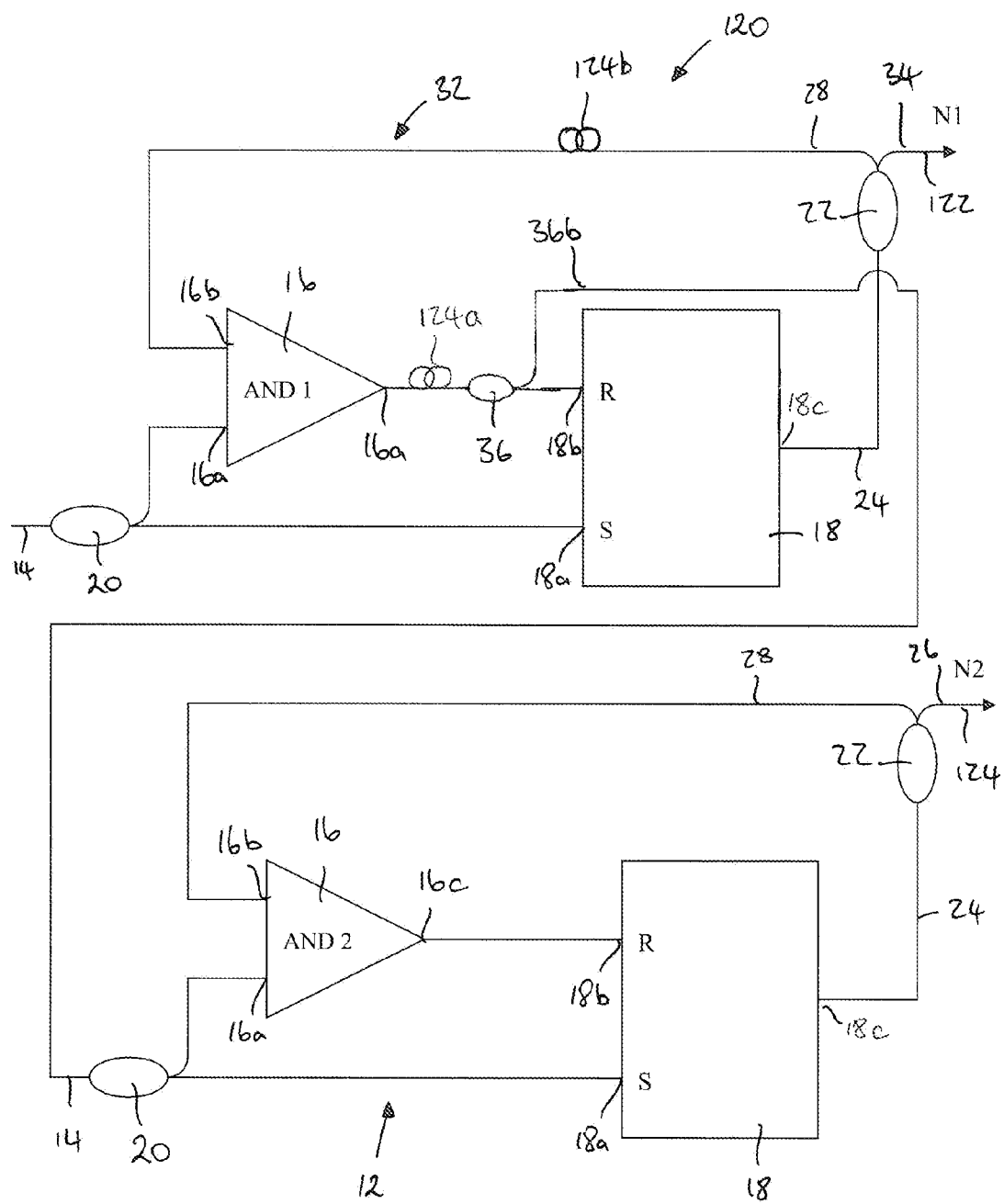
FIG. 12 is a schematic representation of an optical square-wave generator according to an eighth embodiment of the invention.

FIG. 12 shows an optical square wave generator 120 according to an eighth embodiment of the invention. The optical square wave generator 120 is substantially the same as the optical device 30 of FIG. 2, with the following modifications. The same reference numbers are retained for corresponding features.

The first stage 32 of the optical square wave generator 120 further comprises a first optical delay line 124a between the optical AND gate output 16a and the optical splitter 36. A second optical delay line 124 is provided between the optical splitter 22 and the second input 16b of the optical AND gate 16. The optical splitter 22 is arranged to split the flip-flop output signal 24 into a first part 28 which is directed via the optical delay line 124 to the second input 16b of the optical AND gate 16 and a second part 122 which is provided to the first optical output (N1) 34.

In the final device stage 12, the optical splitter 22 is arranged to split the flip-flop output signal 24 into a first part 28 and a second part 124. The second part 124 is provided to the second optical output (N2) 26.

A shown in FIG. 10, the square wave 122 output from the first optical output (N1) 34 of the optical square wave generator 120 has a duty cycle of 50% and a repetition rate of 20 µs. The square wave 124 output from the second optical output (N2) 26 has a duty cycle of 50% and a repetition rate of 10 µs.

Figure 13:
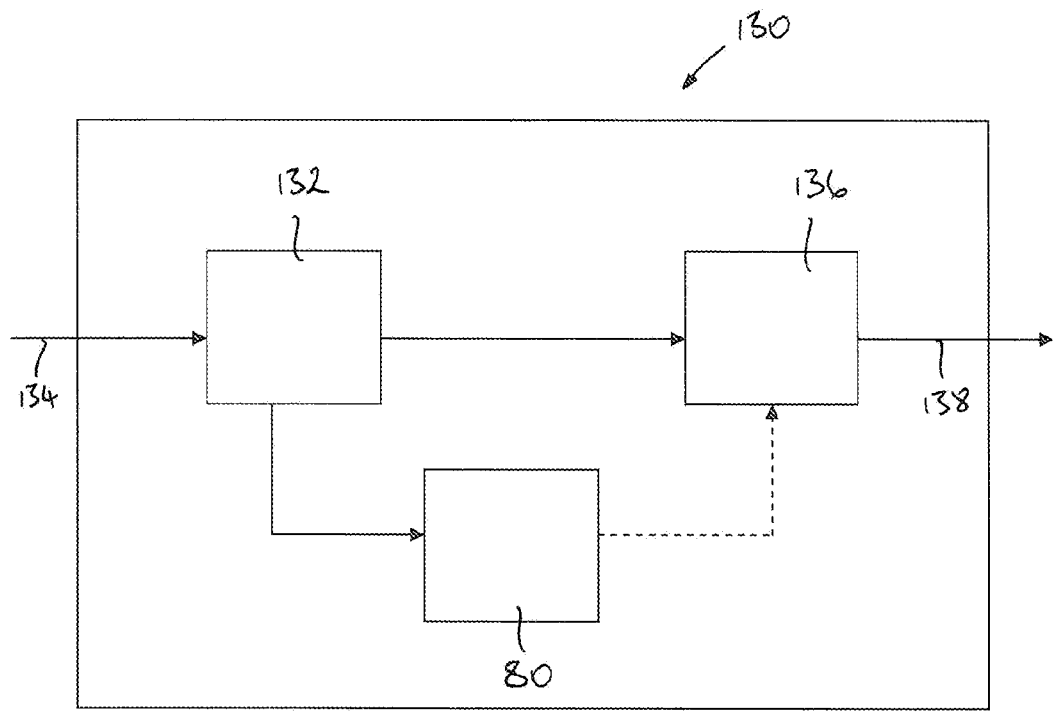
FIG. 13 is a schematic representation of an optical label recognizer according to a ninth embodiment of the invention.

Referring to FIG. 13, a ninth embodiment of the invention provides an optical label recognizer 130. The optical label recognizer 130 comprises an optical label extractor 132, an optical counter 80 and a label processor 136.

The optical label extractor is arranged to receive an optical data packet 134 and to extract an optical label from the optical data packet 134. The label processor 136 is arranged to recognize the resulting extracted optical label and to generate a label signal 138 indicative of the extracted optical label.

Figure 14:
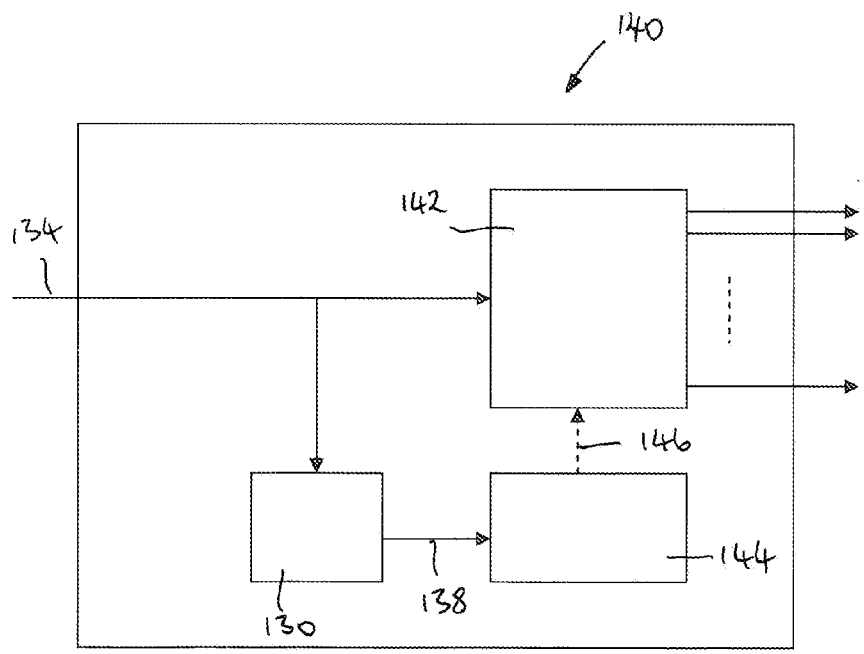
FIG. 14 is a schematic representation of an optical packet switch according to a tenth embodiment of the invention.

Referring to FIG. 14, a tenth embodiment of the invention provides an optical packet switch 140. The optical packet switch 140 comprises an optical label recognizer 130, an optical switch fabric 142 and a controller 144.

The optical packet switch 140 is arranged to receive an optical data packet 134 and to direct part of the optical data packet to the optical label recognizer 130. The optical label recognizer 130 is arranged to generate a label signal 138, as described above in relation to FIG. 13. The controller 144 is arranged to receive the label signal 138 from the optical label recognizer 130. The controller 144 is arranged to generate a switch control signal 146, which is delivered to the optical switch fabric 142. The switch control signal 146 is arranged to control switching of the optical switch fabric 142 in accordance with the label signal 138.

Figure 15:
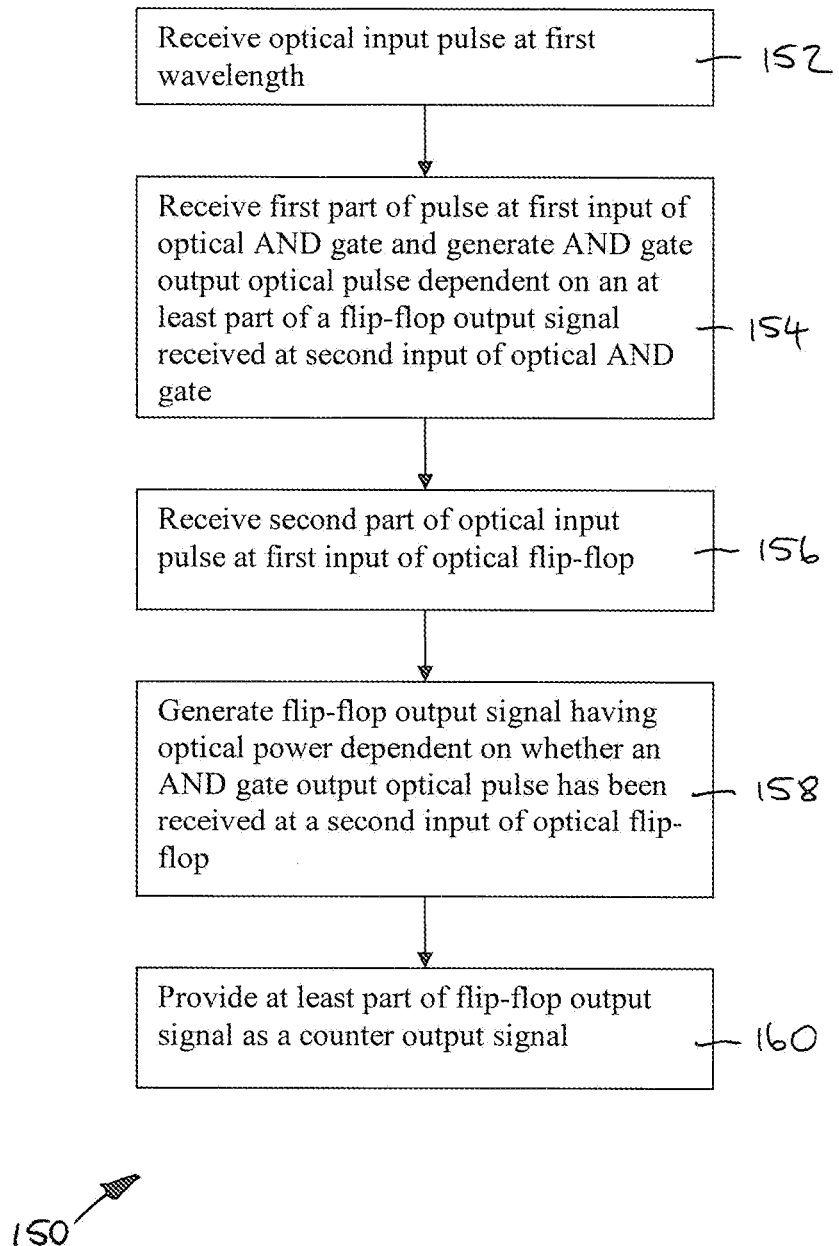
FIG. 15 shows the steps of a method of counting an optical pulse according to an eleventh embodiment of the invention.

An eleventh embodiment of the invention provides a method of counting an optical pulse 150, the steps of the method being shown in FIG. 15.

The method 150 comprises receiving an optical input pulse at a first wavelength 152. A first part of the optical input pulse is received at the first input of an optical AND gate 154. An AND gate optical output pulse is generated, dependent on at least a part of a flip-flop optical output signal received at a second input of the optical AND gate 154. The method further comprises receiving a second part of the optical input pulse at a first input of an optical flip-flop 156. A flip-flop optical output signal is generated 158. The flip-flop output signal has an optical power dependent on whether an AND gate optical output pulse has been received at a second input of the optical flip-flop 158. The generated flip-flop optical output signal is provided as a counter output signal 160.

Figure 16:
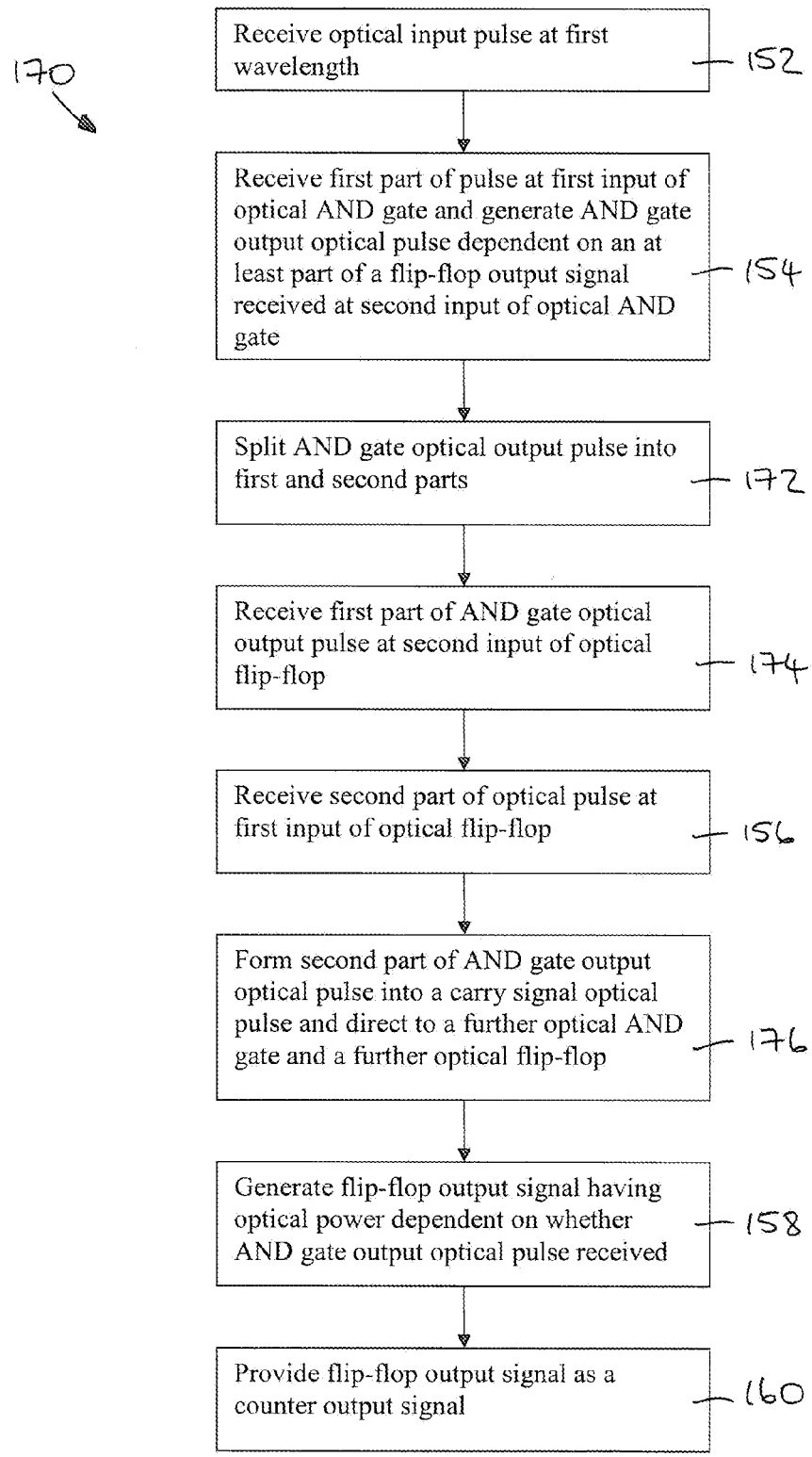
FIG. 16 shows the steps of a method of counting an optical pulse according to an twelfth embodiment of the invention.

FIG. 16 shows the steps of a method of counting an optical pulse 170 according to a twelve embodiment of the invention. The steps of the method of this embodiment are substantially the same as the steps of the method 150 of the previous embodiment with the following modifications. The same reference numbers are retained for corresponding steps.

In this embodiment, following generation of an AND gate output pulse it is split into first and second parts 172. A first part of the AND gate output pulse is received at the second input of the optical flip-flop 174. A second part of the AND gate output pulse is formed into a carry signal optical pulse 176. The carry signal optical pulse is directed to a further optical AND gate and a further optical flip-flop 176.

The invention claimed is:

1. An optical device comprising:
an optical device stage comprising:
an optical input arranged to receive an optical input pulse at an input wavelength;
an optical output arranged to output an optical output signal;
an optical AND gate comprising a first input arranged to receive a part of said input optical pulse, a second input arranged to receive at least a part of a flip-flop optical output signal, and an output, and being arranged to generate an AND gate optical output pulse dependent on said flip-flop optical output signal; and an optical flip-flop comprising a first input arranged to receive a further part of said optical input pulse, a second input arranged to receive a said AND gate optical output pulse, and an output, and being arranged to generate said flip-flop optical output signal at a flip-flop output wavelength, and at least a part of said flip-flop optical output signal being provided to said optical output.

2. An optical device as claimed in claim 1, wherein said optical device comprises:
   a said optical device stage further comprising a first optical splitter arranged to split a said AND gate optical output pulse into a first part to be received by said optical flip-flop and a second part to form a carry signal optical pulse; and
   a final device stage comprising a further said optical device stage, said optical input of said final device stage being arranged to receive a said carry signal optical pulse from said optical device stage, said carry signal optical pulse forming said optical input pulse for said final device stage, at least a part of each said flip-flop optical output signal being provided to said respective optical output.

3. An optical device as claimed in claim 2, wherein said optical device comprises a plurality of said optical device stages and said final device stage, said optical input of a first said optical device stage being arranged to receive a said optical input pulse and said optical input of each subsequent said optical device stage and said final device stage being arranged to receive a respective said carry signal optical pulse from a respective preceding said optical device stage, each said carry signal optical pulse forming a said optical input pulse for said respective device stage, at least a part of said flip-flop optical output signals of said optical device stages being provided to said respective output.

4. An optical device as claimed in any preceding claim 1, wherein the or each said optical flip-flop comprises a coupled pair of waveguide ring lasers, each comprising a non-linear optical gain element.

5. An optical device as claimed in claim 4, wherein said non-linear optical gain element comprises a semi-conductor optical amplifier.

6. An optical device as claimed in claim 1, wherein the or each said flip-flop optical output signal has an optical power below a threshold optical power, being a 0 state, or has an optical power above a threshold optical power, being a 1 state, and the or each said optical AND gate comprises:
   a non-linear optical element arranged to receive a said part of a respective said optical input pulse and a said at least part of a flip-flop optical output signal from a respective said flip-flop, wherein when said flip-flop optical output signal has a 1 state said optical input pulse and said at least part of a flip-flop optical output signal experience a non-linear optical effect on propagation through said nonlinear optical element such that a said AND gate optical output pulse is generated at a further wavelength; and
   an optical filter arranged to transmit at said respective further wavelength.

7. An optical device as claimed in claim 6, wherein said non-linear optical element comprises a semiconductor optical amplifier.

8. An optical device as claimed in claim 6, wherein said non-linear optical effect comprises one of four-wave-mixing and cross-gain-modulation.

9. An optical device as claimed in claim 1, wherein said optical device comprises an optical counter and the or each said optical output comprises a respective output of said optical counter.

10. An optical device as claimed in claim 1, wherein:
    said optical device comprises an optical frequency divider: and
    the or each optical device stage further comprises a first optical splitter and a further optical output arranged to output a further optical output signal, said first optical splitter being arranged to receive at least part of said AND gate optical output pulse and to split off a part of said output pulse to form a frequency divided optical output pulse, said frequency divided optical output pulse being provided to said further optical output.

11. An optical device as claimed in claim 1, wherein said optical device comprises a square-wave generator and the or each said optical output comprises a respective output of said square-wave generator.

12. An optical label recognizer comprising:
    an optical label extractor arranged to extract an optical label from an optical data packet,
    an optical counter as claimed in claim 9, and
    a label processor arranged to recognize an extracted optical label and to generate a label signal indicative of said extracted optical label.

13. An optical packet switch comprising an optical label recognizer as claimed in claim 12, an optical switch fabric and a controller arranged to receive said label signal from said optical label recognizer and to generate a switch control signal arranged to control switching of said optical switch fabric in accordance with said label signal.

14. A method of counting optical pulses, the method comprising:
    receiving an optical input pulse to be counted, said optical input pulse comprising a first wavelength;
    receiving a first part of said input optical pulse at a first input of an optical AND gate and generating an AND gate optical output pulse dependent on at least a part of a flip-flop optical output signal received at a second input of said optical AND gate;
    receiving a second part of said input optical pulse at a first input of an optical flip-flop; and
    generating said flip-flop optical output signal having an optical power dependent upon whether a said AND gate optical output pulse has been received at a second input of said optical flip-flop,
    at least a part of said flip-flop optical output signal being provided as a counter output signal.

15. A method as claimed in claim 14, wherein the method further comprises splitting a said AND gate optical output pulse into first and second parts and receiving said first part at said first input of said optical flip-flop, said second part forming a carry signal optical pulse and said method comprising directing said carry signal optical pulse to a further optical AND gate and a further optical flip-flop for counting.

16. A method as claimed in claim 14, wherein said method comprises receiving said first part of said optical pulse at said first input of said optical AND gate and receiving at least a part of said flip-flop optical output signal at said second input of said optical AND gate, and causing said first part of said optical pulse to experience a non-linear effect when said optical power of said at least part of said flip-flop optical output signal is above a threshold optical power such that a said AND gate optical output pulse comprising a further wavelength is generated.

17. A method as claimed in claim 16, wherein said non-linear optical effect comprises one of four-wave-mixing and cross-gain-modulation.

\* \* \* \* \*